(12) United States Patent
Bassily et al.

(10) Patent No.: US 10,747,184 B2
(45) Date of Patent: Aug. 18, 2020

(54) CONTROLLING A TARGET SYSTEM

(71) Applicant: Siemens Aktiengesellschaft, München (DE)

(72) Inventors: Hany F. Bassily, Oviedo, FL (US); Siegmund Düll, München (DE); Michael Müller, München (DE); Clemens Otte, München (DE); Steffen Udluft, Eichenau (DE)

(73) Assignee: SIEMENS AKTIENGESELLSCHAFT (DE)

( * ) Notice: Subject to any disclaimer, the term of this patent is extended or adjusted under 35 U.S.C. 154(b) by 875 days.

(21) Appl. No.: 15/376,794

(22) Filed: Dec. 13, 2016

(65) Prior Publication Data

US 2017/0090429 A1    Mar. 30, 2017

Related U.S. Application Data

(63) Continuation of application No. PCT/EP2015/060298, filed on May 11, 2015, which
(Continued)

(51) Int. Cl.
*G06N 5/04* (2006.01)
*G05B 13/02* (2006.01)

(52) U.S. Cl.
CPC .......... *G05B 13/027* (2013.01); *G06N 5/04* (2013.01)

(58) Field of Classification Search
None
See application file for complete search history.

(56) References Cited

U.S. PATENT DOCUMENTS 5,734,593 A   3/1998  Madni et al.
6,574,754 B1  6/2003  Smith
(Continued)

FOREIGN PATENT DOCUMENTS

CN     1494668 A1   5/2004
CN   101103321 A    1/2008
(Continued)

OTHER PUBLICATIONS

Anderson, et al., Adaptive Torque-based Control of a Humanoid Robot on an Unstable Platform, 2010 IEEE-RAS International Conference on Humanoid Robots, (2010) pp. 511-517 (Year: 2010).*
(Continued)

*Primary Examiner* — Wilbert L Starks
(74) *Attorney, Agent, or Firm* — Schmeiser, Olsen & Watts LLP

(57) ABSTRACT

For controlling a target system, e.g. a gas or wind turbine or another technical system, a pool of control policies is provided. The pool of control policies comprising a plurality of control policies and weights for weighting each of the plurality of control policies are received. The plurality of control policies is weighted by the weights to provide a weighted aggregated control policy. With that, the target system is controlled using the weighted aggregated control policy, and performance data relating to a performance of the controlled target system are received. Furthermore, the weights are adjusted on the basis of the received performance data to improve the performance of the controlled target system. With that, the plurality of control policies is reweighted by the adjusted weights to adjust the weighted aggregated control policy.

14 Claims, 2 Drawing Sheets

Related U.S. Application Data is a continuation of application No. 14/309,641, filed on Jun. 19, 2014, now abandoned.

(56) References Cited

U.S. PATENT DOCUMENTS

| | | | |
|---|---|---|---|
| 6,577,908 | B1 | 6/2003 | Wojsznis et al. |
| 2002/0147506 | A1 | 10/2002 | Eryurek |
| 2006/0136075 | A1 | 6/2006 | Sun et al. |
| 2006/0155664 | A1 | 7/2006 | Morikawa et al. |

FOREIGN PATENT DOCUMENTS

| | | |
|---|---|---|
| CN | 101178580 A | 5/2008 |
| CN | 103019097 A | 4/2013 |
| CN | 103034122 A | 4/2013 |
| DE | 10197407 B4 | 6/2017 |
| WO | 2004068399 A1 | 8/2004 |

OTHER PUBLICATIONS

Desjardins, Cooperative Adaptive Cruise Control: A Learning Approach, Masters Thesis, Universite Laval, (2009) pp. 1-130 (Year: 2009).*

Shiraga N. et al: "A reinforcement learning algorithm for neural networks with incremental learning ability"; Graduate School of Science and Technology; Kobe University: Kobe; Japan; Proceedings of the 9th international Conference on Neural Information Processing; 2002. ICONIP '02.; pp. 2566; XP055203510; DOI: 10.1109/ICONIP.2002.1201958; ISBN: 978-9-81-047524-6; 2002.

International Search Report for PCT Application No. PCT/EP2015/060298, dated Jul. 27, 2015.

Pingan, He et al; "Reinforcement Learning Neural-Network-Based Controller for Nonlinear Discrete-Time Systems With Input Constraints"; IEEE Transactions on Systems; International conference on Fuzzy Systems; Man, and Cybernetics—Part B; Cybernetics, vol. 37; No. 2; pp. 425-436; 2007.

Jang, Jyh-Shing Roger et al; "Input Selection for ANFIS Learning"; Department of Computer Science; National Tsing Hua University Elsinchu, Taiwan; Proceedings of the 5th IEEE International Conference on Fuzzy Systems; vol. 2; pp. 1493-1499; 1996.

Nakamura Yutaka: "Natural Policy Gradient Reinforcement Learning for a CPG Control of a Biped Robot"; CPEL 1653586P; pp. 972-981; 2004; Springer-Verlag Berlin Heidelberg 2004; 2004.

Non-English Chinese Office Action for Application No. 201580032397.5, dated Nov. 1, 2018.

Non-English Korean Patent Application No. 10-2017-7001589; Notice of Allowance dated Dec. 24, 2018. (Translation of allowed claims).

* cited by examiner

CONTROLLING A TARGET SYSTEM

CROSS-REFERENCE TO RELATED APPLICATIONS

This is a continuation of International Application No. PCT/EP2015/060298, having an international filing date of May 11, 2015, which claims priority to U.S. application Ser. No. 14/309,641, having a filing date of Jun. 19, 2014, the entire contents of both which are hereby incorporated by reference.

FIELD OF TECHNOLOGY

The following relates to embodiments of controlling a target system.

BACKGROUND

The control of complex dynamical technical systems, (e.g., gas turbines, wind turbines, or other plants), may be optimized by so-called data driven approaches. With that, various aspects of such dynamical systems may be improved. For example, efficiency, combustion dynamics, or emissions for gas turbines may be improved. Additionally, life-time consumption, efficiency, or yaw for wind turbines may be improved.

Modern data driven optimization utilizes machine learning methods for improving control policies (also denoted as control strategies) of dynamical systems with regard to general or specific optimization goals. Such machine learning methods may allow to outperform conventional control strategies. In particular, if the controlled system is changing, an adaptive control approach capable of learning and adjusting a control strategy according to the new situation and new properties of the dynamical system may be advantageous over conventional non-learning control strategies.

However, in order to optimize complex dynamical systems, (e.g., gas turbines or other plants), a sufficient amount of operational data is to be collected in order to find or learn a good control strategy. Thus, in case of commissioning a new plant, upgrading or modifying it, it may take some time to collect sufficient operational data of the new or changed system before a good control strategy is available. Reasons for such changes might be wear, changed parts after a repair, or different environmental conditions.

Known methods for machine learning include reinforcement learning methods that focus on data efficient learning for a specified dynamical system. However, even when using these methods it may take some time until a good data driven control strategy is available after a change of the dynamical system. Until then, the changed dynamical system operates outside a possibly optimized envelope. If the change rate of the dynamical system is very high, only sub-optimal results for a data driven optimization may be achieved since a sufficient amount of operational data may be never available.

SUMMARY

An aspect relates to creating a method, a controller, and a computer program product for controlling a target system that allow a more rapid learning of a control policy, in particular, for a changing target system.

Embodiments of the present invention a method, a controller, or a computer program product for controlling a target system (e.g., a gas or wind turbine or another technical system) by a processor, is based on a pool of control policies. The method, controller, or computer program product is configured to receive the pool of control policies comprising a plurality of control policies, and to receive weights for weighting each of the plurality of control policies. The plurality of control policies is weighted by the weights to provide a weighted aggregated control policy. With that, the target system is controlled using the weighted aggregated control policy, and performance data relating to a performance of the controlled target system are received. Furthermore, the weights are adjusted by the processor on the basis of the received performance data to improve the performance of the controlled target system. With that, the plurality of control policies is reweighted by the adjusted weights to adjust the weighted aggregated control policy.

Embodiments of the invention allow for an effective learning of peculiarities of the target system by adjusting the weights for the plurality of control policies. Usually, such weights comprise much less parameters than the pool of control policies itself. Thus, the adjusting of the weights may require much less computing effort and may converge much faster than a training of the whole pool of control policies. Hence, a high level of optimization may be reached in a shorter time. In particular, a reaction time to changes of the target system may be significantly reduced. Moreover, aggregating a plurality of control policies reduces a risk of accidentally choosing a poor policy, thus increasing the robustness of the method.

According to an embodiment of the invention the weights may be adjusted by training a neural network run by the processor.

The usage of a neural network for the adjusting of the weights allows for an efficient learning and flexible adaptation.

According to a further embodiment of the invention the plurality of control policies may be calculated from different data sets of operational data of one or more source systems, preferably by training a neural network. The different data sets may relate to different source systems, to different versions of one or more source systems, to different policy models, to source systems in different climes, or to one or more source systems under different conditions (e.g., before and after repair, maintenance, changed parts, etc.).

The one or more source systems may be chosen similar to the target system, so that control policies optimized for the one or more source systems are expected to perform well for the target system. Therefore, the plurality of control policies based on one or more similar source systems are a good starting point for controlling the target system. Such a learning from similar situations is often denoted as "transfer learning". Hence, much less performance data relating to the target system are needed in order to obtain a good aggregated control policy for the target system. Thus, effective aggregated control policies may be learned in a short time even for target systems with scarce data.

The calculation of the plurality of control policies may use a reward function relating to a performance of the source systems. Preferably, that reward function is also used for adjusting the weights.

Furthermore, the performance data may comprise state data relating to a current state of the target system. Then, the plurality of control policies may be weighted and/or reweighted in dependence of the state data. This allows for a more accurate and more effective adjustment of the weights. In particular, the weight of a control policy may be increased if a state is recognized where that control policy turned out to perform well and vice versa.

Advantageously, the performance data may be received from the controlled target system, from a simulation model of the target system, and/or from a policy evaluation. Performance data from the controlled target system allow to monitor the actual performance of the target system and to improve that performance by learning a particular response characteristic of the target system. A simulation model of the target system, on the other hand, also allows what-if queries for the reward function. Furthermore, with a policy evaluation a so called Q-function may be set up, allowing to determine an expectation value for the reward function.

Moreover, an aggregated control action for controlling the target system may be determined according to the weighted aggregated control policy by weighted majority voting, by forming a weighted mean, and/or by forming a weighted median from action proposals according to the plurality of control policies.

According to a preferred embodiment of the invention the training of the neural network may be based on a reinforcement learning model, which allows an efficient learning of control policies for dynamical systems.

In particular, the neural network may operate as a recurrent neural network. This allows for maintaining an internal state enabling an efficient detection of time dependent patterns when controlling a dynamical system. Moreover, many so-called Partially Observable Markov Decision Processes may be handled like so-called Markov Decision Processes by a recurrent neural network The plurality of control policies may be selected from the pool of control policies in dependence of a performance evaluation of control policies. The selected control policies may establish a so called ensemble of control policies. In particular, only those control policies may be selected from the pool of control policies which perform well according to a predefined criterion.

Furthermore, control policies from the pool of control policies may be included into the plurality of control policies or excluded from the plurality of control policies in dependence of the adjusted weights. This allows to improve the selection of control policies contained in the plurality of control policies. So, for example, control policies with very small weights may be removed from the plurality of control policies in order to reduce an computational effort.

BRIEF DESCRIPTION OF THE DRAWINGS

Some of the embodiments will be described in detail, with reference to the following figures, wherein like designations denote like members, wherein.

DETAILED DESCRIPTION

Figure 1:
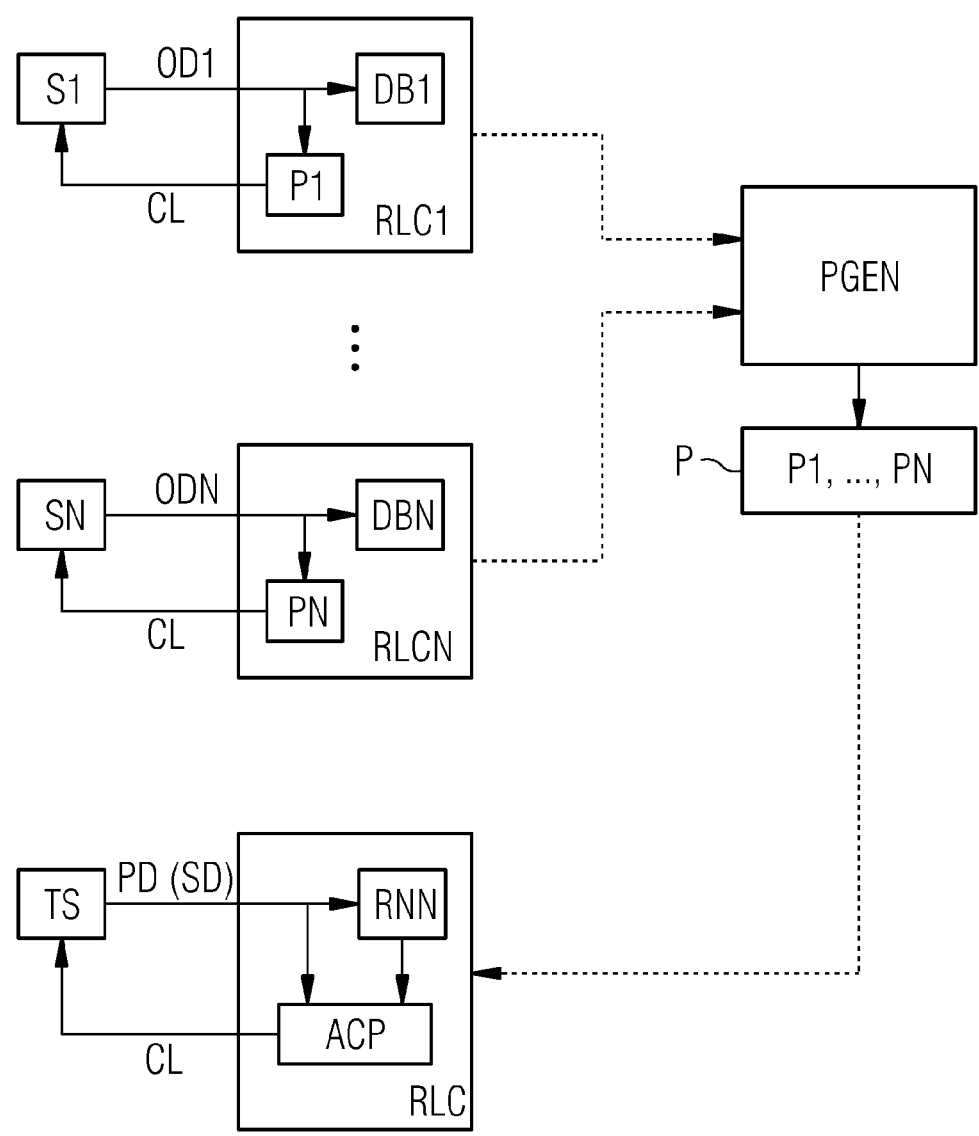
FIG. 1 illustrates an exemplary embodiment of the invention including a target system and several source systems together with controllers generating a pool of control policies.

FIG. 1 illustrates an exemplary embodiment of the invention including a target system TS and several source systems S1, . . . , SN. The target system TS and the source systems S1, . . . , SN may be gas or wind turbines or other dynamical systems including simulation tools for simulating a dynamical system. Preferably, the source systems S1, . . . , SN are chosen to be similar to the target system TS.

The source systems S1, . . . , SN may also include the target system TS at a different time, e.g., before maintenance of the target system TS or before exchange of a system component, etc. Vice versa, the target system TS may be one of the source systems S1, . . . , SN at a later time.

Each of the source systems S1, . . . , SN is controlled by a reinforcement learning controller RLC1, . . . , or RLCN, respectively, the latter being driven by a control policy P1, . . . , or PN, respectively. The reinforcement learning controllers RLC1, . . . , RLCN each may comprise a recurrent neural network (not shown) for learning, i.e. optimizing the control policies P1, . . . , PN. Source system specific operational data OD1, . . . , ODN of the source systems S1, . . . , SN are collected and stored in data bases DB1, . . . , DBN. The operational data OD1, . . . , ODN are processed according to the control policies P1, . . . , PN and the latter are refined by reinforcement learning by the reinforcement learning controllers RLC1, . . . , RLCN. The control output of the control policies P1, . . . , PN is fed back into the respective source system S1, . . . , or SN via a control loop CL, resulting in a closed learning loop for the respective control policy P1, . . . , or PN in the respective reinforcement learning controller RLC1, . . . , or RLCN. The control policies P1, . . . , PN are fed into a reinforcement learning policy generator PGEN, which generates a pool P of control policies comprising the control policies P1, . . . , PN.

The target system TS is controlled by a reinforcement learning controller RLC comprising a recurrent neural network RNN and an aggregated control policy ACP. The reinforcement learning controller RLC receives the control policies P1, . . . , PN from the reinforcement learning policy generator PGEN and generates the aggregated control policy ACP from the control policies P1, . . . , PN.

Furthermore, the reinforcement learning controller RLC receives from the target system TS performance data PD relating to a current performance of the target system TS, e.g. a current power output, a current efficiency, etc. The performance data PD include state data SD relating to a current state of the target system TS, e.g. temperature, rotation speed, etc. The performance data PD are input to the recurrent neural network RNN for its training and input to the aggregated control policy ACP for generating an aggregated control action for controlling the target system TS via a control loop CL. This results in a closed learning loop for the reinforcement learning controller RLC.

The usage of pre-trained control policies P1, . . . , PN from several similar source systems S1, . . . , SN gives a good starting point for a neural model run by the reinforcement learning controller RLC. With that, the amount of data and/or time required for learning an efficient control policy for the target system TS may be reduced considerably.

Figure 2:
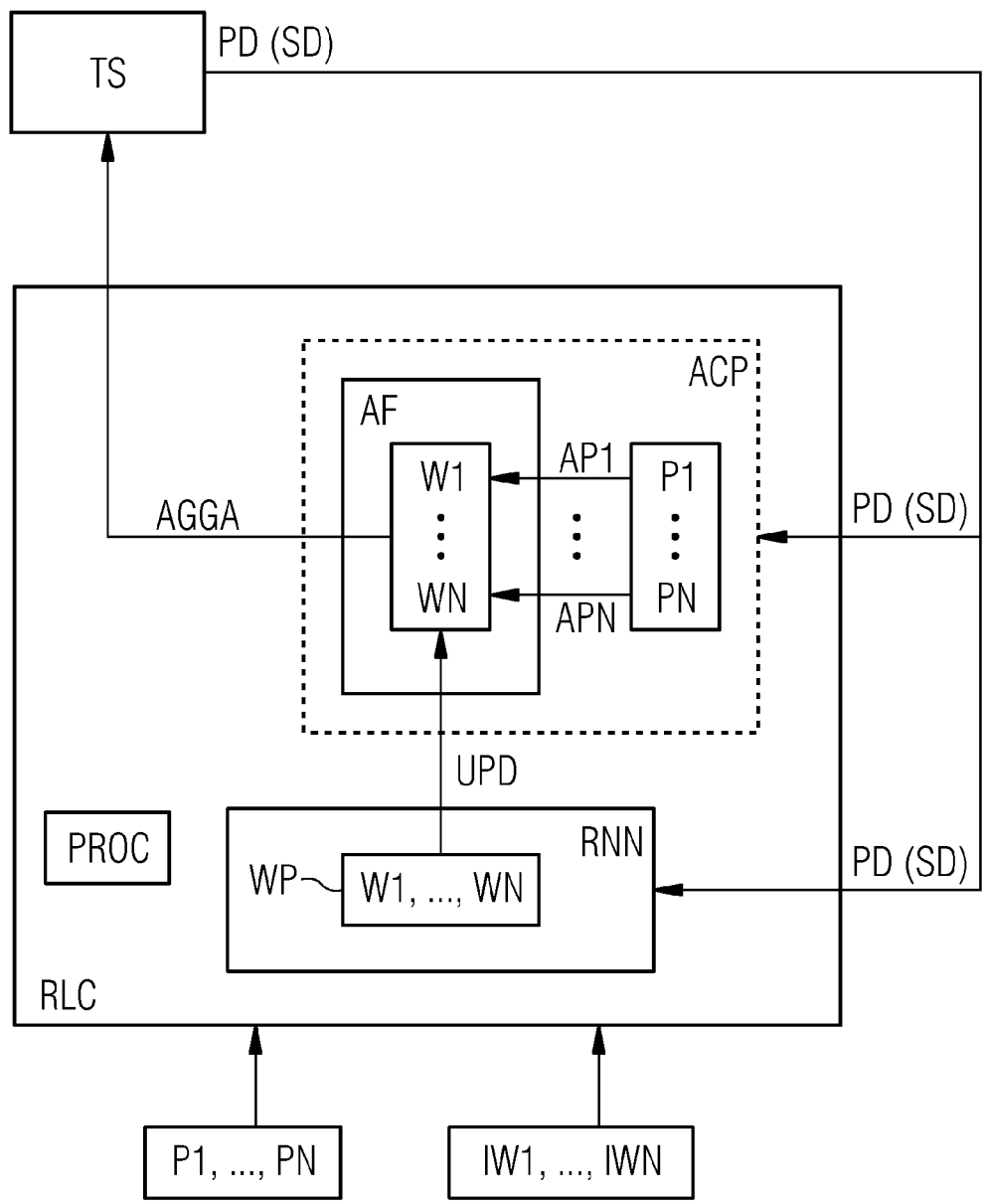
FIG. 2 illustrates the target system together with a controller in greater detail.

FIG. 2 illustrates the target system TS together with the reinforcement learning controller RLC in greater detail. The reinforcement learning controller RLC comprises a processor PROC and—as already mentioned above—the recurrent neural network RNN and the aggregated control policy ACP. The recurrent neural network RNN implements a reinforcement learning model.

The performance data PD(SD) including the state data SD stemming from the target system TS are input to the recurrent neural network RNN and to the aggregated control policy ACP. Moreover, the control policies P1, . . . , PN are input to the reinforcement learning controller RLC. The control policies P1, . . . , PN may comprise the whole pool P or a selection of control policies from the pool P.

The recurrent neural network RNN is adapted to train a weighting policy WP comprising weights W1, . . . , WN for weighting each of the control policies P1, . . . , PN. The weights W1, . . . , WN are initialized by initial weights IW1, . . . , IWN received by the reinforcement learning controller RLC e.g. from the reinforcement learning policy generator PGEN or from a different source.

The aggregated control policy ACP relies on an aggregation function AF receiving the weights W1, . . . , WN from the recurrent neural network RNN and on the control policies P1, . . . , PN. Each of the control policies P1, . . . , PN or a pre-selected part of them receives the performance data PD(SD) with the state data SD and calculates from them a specific action proposal AP1, . . . , or APN, respectively. The action proposals AP1, . . . , APN are input to the aggregation function AF, which weights each of the action proposals AP1, . . . , APN with a respective weight W1, . . . , or WN to generate an aggregated control action AGGA from them. The action proposals AP1, . . . , APN may be weighted e.g. by majority voting, by forming a weighted mean, and/or by forming a weighted median from the control policies P1, . . . , PN. The target system TS is then controlled by the aggregated control action AGGA.

The performance data PD(SD) resulting from the control of the target system TS by the aggregated control action AGGA are fed back to the aggregated control policy ACP and to the recurrent neural network RNN. From the fed back performance data PD(SD) new specific action proposals AP1, . . . , APN are calculated by the control policies P1, . . . , PN. The recurrent neural network RNN, on the other hand, uses a reward function (not shown) relating to a desired performance of the target system TS for adjusting the weights W1, . . . , WN in dependence of the performance data PD(SD) fed back from the target system TS. The weights W1, . . . , WN are adjusted by reinforcement learning with an optimization goal directed to an improvement of the desired performance. With the adjusted weights W1, . . . , WN an update UPD of the aggregation function AF is made. The updated aggregation function AF then weights the new action proposals AP1, . . . , APN, i.e. reweights the control policies P1, . . . , PN, by the adjusted weights W1, . . . , WN in order to generate a new aggregated control action AGGA for controlling the target system TS. The above steps implement a closed learning loop leading to a considerable improvement of the performance of the target system TS.

A more detailed description of the embodiment is given below:

Each control policy P1, . . . , PN is initially calculated by the reinforcement learning controllers RLC1, . . . , RLCN based on a set of operational data OD1, . . . , or ODN, respectively. The set of operational data for a specific control policy may be specified in multiple ways. Examples for such specific sets of operational data may be operational data of a single system, e.g. a single plant, operational data of multiple plants of a certain version, operational data of plants before and/or after a repair, or operational data of plants in a certain clime, in a certain operational condition, and/or in a certain environmental condition. Furthermore, different control policies from P1, . . . , PN may refer to different policy models trained on a same set of operational data.

When applying any of such control policies specific to a certain source system to a target system, it generally may not perform optimally since none of the data sets was representative for the target system. Therefore, a number of control policies may be selected from the pool P to form an ensemble of control policies P1, . . . , PN. Each control policy P1, . . . , PN provides a separate action proposal AP1, . . . , or APN, from the performance data PD(SD). The action proposals AP1, . . . , APN are aggregated to calculate the aggregated control action AGGA of the aggregated control policy ACP. In case of discrete action proposals AP1, . . . , APN, the aggregation may be performed using majority voting. If the action proposals AP1, . . . , APN are continuous, a mean or median value of the action proposals AP1, . . . , APN may be used for the aggregation.

The reweighting of the control policies P1, . . . , PN by the adjusted weights W1, . . . , WN allows for a rapid adjustment of the aggregated control policy ACP, in particular, if the target system TS changes. The reweighting depends on the recent performance data PD(SD) generated while interacting with the target system TS. Since the weighting policy WP has less free parameters, i.e. the weights W1, . . . , WN, than a control policy usually has, less data is required to adjust to a new situation or to a modified system. The weights W1, . . . , WN may be adjusted using the current performance data PD(SD) of the target system and/or using a model of the target system (implemented by e.g. an additional recurrent neural network) and/or using a so called policy evaluation.

According to a simple implementation each control policy P1, . . . , PN may be globally weighted (i.e., over a complete state space of the target system TS). A weight of zero may indicate that a particular control policy is not part of the ensemble of policies.

Additionally or alternatively, the weighting by the aggregation function AF may depend on the system state, i.e. on the state data SD of the target system TS. This may be used to favor good control policies with high weights within one region of the state space of the target system TS. Within other regions of the state space those control polices might not be used at all.

Specifically, let $P_i$, i=1, . . . , N, denote a control policy from the set of stored control policies P1, . . . , PN and let s be a vector denoting a current state of the target system TS. Then a weight function $f(P_i,s)$ may assign a weight $W_i$ (of the set W1, . . . , WN) to the respective control policy $P_i$ dependent on the current state denoted by s, i.e. $W_i=f(P_i,s)$. A possible approach may be to calculate the weights $W_i$ based on distances (according to a pre-defined metric of the state space) between the current state s and states stored together with $P_i$ in a training set containing those states where $P_i$ performed well. Uncertainty estimates, e.g. provided by a probabilistic policy, may also be included in the weight calculation.

Preferably, the global and/or state dependent weighting is optimized using reinforcement learning. The action space of such a reinforcement learning problem is the space of the weights W1, . . . , WN, while the state space is defined in the state space of the target system TS. For a pool of e.g. ten control policies the action space is only ten dimensional and, therefore, allows a rapid optimization with comparably little input data and little computational effort. So called meta actions may be used to reduce the dimensionality of the action space even further. So called delayed effects are mitigated by using the reinforcement learning approach.

The adjustment of the weights W1, . . . , WN is preferably carried out by applying a measured performance of the ensemble of control policies P1, . . . , PN to a reward function. The reward function may be preferably chosen according to the goal of maximizing efficiency, maximizing output, minimizing emissions, and/or minimizing wear of the target system TS. In particular, a reward function used to train the control policies P1, . . . , PN may be used for training and/or initializing the weighting policy WP.

With the trained weights W1, ..., WN the aggregated control action AGGA may be computed according to AGGA=AF(s, AP1, ..., APN, W1, ..., WN) with $AP_i=P_i(s)$, i=1, ..., N.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a target system by a processor on the basis of a pool of control policies, the method comprising:
    a) receiving the pool of control policies comprising a plurality of control policies,
    b) receiving weights for weighting each of the plurality of control policies,
    c) weighting the plurality of control policies by the weights to provide a weighted aggregated control policy,
    d) controlling the target system using the weighted aggregated control policy,
    e) receiving performance data relating to a performance of the controlled target system,
    f) adjusting the weights by the processor on the basis of the received performance data to improve the performance of the controlled target system, wherein the weights are adjusted by training a neural network run by the processor, the neural network adapted to train a weighting policy comprising the weights, wherein the weighting policy has less parameters than the control policy, and
    g) reweighting the plurality of control policies by the adjusted weights to adjust the weighted aggregated control policy.

2. The method as claimed in claim 1, further comprising receiving operational data of at least one source system, and calculating the plurality of control policies from different data sets of the operational data received from the at least one source system.

3. The method as claimed in claim 2, wherein the plurality of control policies are calculated by training the neural network or a further neural network.

4. The method as claimed in claim 3, wherein the calculation of the plurality of control policies uses a reward function relating to a performance of the at least on source system, and
    the reward function is used for the adjusting of the weights.

5. The method as claimed in claim 2, wherein the training of the neural network is based on a reinforcement learning model.

6. The method as claimed in claim 2, wherein the neural network operates as a recurrent neural network.

7. The method as claimed in claim 1, wherein the performance data comprise state data relating to a current state of the target system and the weighting and/or the reweighting of the plurality of control policies depends on the state data.

8. The method as claimed in claim 1, wherein the performance data are received from the controlled target system, from a simulation model of the target system, and/or from a policy evaluation.

9. The method as claimed in claim 1, wherein for controlling the target system an aggregated control action is determined according to the weighted aggregated control policy by weighted majority voting, by forming a weighted mean, and/or by forming a weighted median from action proposals according to the plurality of control policies.

10. The method as claimed in claim 1, wherein the plurality of control policies is selected from the pool of control policies in dependence of a performance evaluation of control policies.

11. The method as claimed in claim 1, wherein control policies from the pool of control policies are included into or excluded from the plurality of control policies in dependence of the adjusted weights.

12. The method as claimed in claim 1, wherein steps d) to g) of claim 1 are run in a closed learning loop with the target system.

13. A controller for controlling a target system on the basis of a pool of control policies, adapted to perform the method of claim 1.

14. A computer program product for controlling a target system by a processor on the basis of a pool of control policies, adapted to perform the method of claim 1.

* * * * *